(12) United States Patent
Shin et al.

(10) Patent No.: US 11,029,816 B2
(45) Date of Patent: *Jun. 8, 2021

(54) MOBILE DEVICE AND METHOD FOR EXECUTING PARTICULAR FUNCTION THROUGH TOUCH EVENT ON COMMUNICATION RELATED LIST

(71) Applicant: Samsung Electronics Co., Ltd., Gyeonggi-do (KR)

(72) Inventors: Hyun Kyung Shin, Seoul (KR); In Won Jong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 193 days.

This patent is subject to a terminal disclaimer.

(21) Appl. No.: 15/719,865

(22) Filed: Sep. 29, 2017

(65) Prior Publication Data

US 2018/0024710 A1    Jan. 25, 2018

Related U.S. Application Data

(63) Continuation of application No. 12/781,923, filed on May 18, 2010, now Pat. No. 9,817,546.

(30) Foreign Application Priority Data

May 19, 2009  (KR) .......................... 10-2009-0043414

(51) Int. Cl.
*G06F 3/0482* (2013.01)
*G06F 3/0488* (2013.01)
*G06F 3/0485* (2013.01)
*H04M 1/72469* (2021.01)
(Continued)

(52) U.S. Cl.
CPC .......... *G06F 3/0482* (2013.01); *G06F 3/0485* (2013.01); *G06F 3/04883* (2013.01);
(Continued)

(58) Field of Classification Search
CPC .. G06F 3/0482; G06F 3/04883; G06F 3/0485; H04M 1/72583; H04M 1/274525; H04M 2250/22; H04M 1/72552
See application file for complete search history.

(56) References Cited

U.S. PATENT DOCUMENTS 7,081,882 B2    7/2006  Sowden et al.
7,479,949 B2    1/2009  Jobs et al.
(Continued)

FOREIGN PATENT DOCUMENTS

AU    2008-201540 B2    1/2008
CN    1295419 A    5/2001
(Continued)

OTHER PUBLICATIONS

"Particular Tutorial of biteSMS Short Message Tool", http://iphone.tgbus.com/tutorial/use/200809/20080929080743_2.shtml.
(Continued)

*Primary Examiner* — Shen Shiau
(74) *Attorney, Agent, or Firm* — Cha & Reiter, LLC.

(57) ABSTRACT

A mobile device and a touch-based operation method allow a user to easily and conveniently use a desired communication-related function through a touch-sensitive interface. The mobile device displays a scrollable communication-related list that includes but is not limited to a call log list, a message list, a phonebook list, and an email list. When a specific item is selected in response to a first touch event, the mobile device determines whether or not a second touch event occurs on the selected item in a non-scrollable direction. Then the mobile device executes a particular function predefined in the selected item in response to the second touch event occurring in the non-scrollable direction.

18 Claims, 5 Drawing Sheets

(51) Int. Cl.
H04M 1/2747 (2020.01)
H04M 1/72436 (2021.01)

(52) U.S. Cl.
CPC ...... *H04M 1/72469* (2021.01); *H04M 1/2747* (2020.01); *H04M 1/72436* (2021.01); *H04M 2250/22* (2013.01)

(56) References Cited

U.S. PATENT DOCUMENTS

| | | | |
|---|---|---|---|
| 8,522,157 B2* | 8/2013 | Park | G06F 3/048 715/786 |
| 8,812,058 B2* | 8/2014 | Lee | G06F 3/0482 455/566 |
| 8,910,068 B2* | 12/2014 | Shin | G06F 3/0485 715/765 |
| 9,112,988 B2* | 8/2015 | Lee | H04M 1/72547 |
| 9,304,675 B2* | 4/2016 | Lemay | G06F 3/0482 |
| 9,405,437 B2* | 8/2016 | Park | G06F 3/0482 |
| 9,654,426 B2* | 5/2017 | Underwood, IV | H04L 51/38 |
| 9,817,546 B2* | 11/2017 | Shin | G06F 3/0482 |
| 9,898,162 B2* | 2/2018 | Jisrawi | G06F 3/0488 |
| 9,996,157 B2* | 6/2018 | Chaudhri | G06F 3/0412 |
| 10,552,032 B2* | 2/2020 | Lippolis | G06F 3/04883 |
| 2001/0024195 A1 | 9/2001 | Hayakawa | |
| 2001/0047263 A1 | 11/2001 | Smith et al. | |
| 2003/0020687 A1 | 1/2003 | Sowden et al. | |
| 2004/0100479 A1 | 5/2004 | Nakano et al. | |
| 2006/0041847 A1 | 2/2006 | Maw | |
| 2006/0161858 A1 | 7/2006 | Hawkins et al. | |
| 2006/0197750 A1 | 9/2006 | Kerr et al. | |
| 2006/0246955 A1 | 11/2006 | Nirhamo et al. | |
| 2006/0284852 A1* | 12/2006 | Hofmeister | G06F 3/0483 345/173 |
| 2007/0150842 A1 | 6/2007 | Chaudhri et al. | |
| 2007/0226204 A1 | 9/2007 | Feldman | |
| 2008/0012836 A1 | 1/2008 | Yokota | |
| 2008/0057926 A1* | 3/2008 | Forstall | H04M 1/27475 455/415 |
| 2008/0074399 A1* | 3/2008 | Lee | G06F 3/0482 345/173 |
| 2008/0094371 A1* | 4/2008 | Forstall | G06F 3/04883 345/173 |
| 2008/0122796 A1* | 5/2008 | Jobs | H04M 1/72522 345/173 |
| 2008/0165141 A1 | 7/2008 | Christie | |
| 2008/0168404 A1 | 7/2008 | Ording | |
| 2008/0170681 A1 | 7/2008 | Bae et al. | |
| 2008/0215980 A1 | 9/2008 | Lee et al. | |
| 2008/0220752 A1* | 9/2008 | Forstall | H04M 1/56 455/415 |
| 2008/0297485 A1 | 12/2008 | Park | |
| 2008/0313568 A1 | 12/2008 | Park et al. | |
| 2009/0006955 A1 | 1/2009 | Wang et al. | |
| 2009/0019401 A1* | 1/2009 | Park | G06F 3/04883 715/841 |
| 2009/0070711 A1 | 3/2009 | Kwak et al. | |
| 2009/0075694 A1 | 3/2009 | Kim et al. | |
| 2009/0093277 A1* | 4/2009 | Lee | G06F 3/04817 455/566 |
| 2009/0244019 A1* | 10/2009 | Choi | G06F 3/04883 345/173 |
| 2009/0258638 A1 | 10/2009 | Lee | |
| 2009/0271731 A1* | 10/2009 | Lin | G06F 3/04883 715/776 |
| 2009/0278806 A1* | 11/2009 | Duarte | G06F 3/03547 345/173 |
| 2009/0282360 A1* | 11/2009 | Park | H04M 1/72469 715/786 |
| 2010/0004031 A1* | 1/2010 | Kim | H04M 1/274525 455/566 |
| 2010/0039399 A1 | 2/2010 | Kim | |
| 2010/0056221 A1* | 3/2010 | Park | G06F 3/048 455/566 |
| 2010/0141684 A1 | 6/2010 | Machida | |
| 2010/0175018 A1 | 7/2010 | Petschnigg et al. | |
| 2010/0262928 A1* | 10/2010 | Abbott | G06F 3/04817 715/769 |
| 2010/0295805 A1* | 11/2010 | Shin | G06F 3/0482 345/173 |
| 2010/0299599 A1* | 11/2010 | Shin | G06F 3/04883 715/702 |
| 2010/0299638 A1* | 11/2010 | Choi | G06F 3/04883 715/835 |
| 2011/0025632 A1 | 2/2011 | Lee | |
| 2011/0041102 A1* | 2/2011 | Kim | G06F 3/04883 715/863 |
| 2011/0083105 A1* | 4/2011 | Shin | G06F 3/0482 715/830 |
| 2011/0126126 A1* | 5/2011 | Blair | G06Q 10/107 715/752 |
| 2011/0202878 A1* | 8/2011 | Park | G06F 3/0482 715/825 |
| 2011/0252362 A1* | 10/2011 | Cho | G06F 3/0485 715/784 |
| 2011/0314374 A1* | 12/2011 | Chae | H04M 1/72522 715/702 |
| 2013/0063373 A1* | 3/2013 | Roh | G06F 3/0481 345/173 |
| 2014/0223347 A1* | 8/2014 | Seo | G06F 3/0486 715/769 |
| 2014/0325416 A1 | 10/2014 | Lee et al. | |
| 2015/0067596 A1* | 3/2015 | Brown | G06F 3/0416 715/808 |
| 2015/0074594 A1* | 3/2015 | Shin | G06F 3/04886 715/784 |
| 2015/0346916 A1* | 12/2015 | Jisrawi | G06F 3/04817 715/752 |
| 2016/0259413 A1* | 9/2016 | Anzures | G06F 3/04817 |
| 2017/0046024 A1* | 2/2017 | Dascola | G06F 3/0485 |
| 2017/0357317 A1* | 12/2017 | Chaudhri | G06F 3/0412 |
| 2018/0024710 A1* | 1/2018 | Shin | G06F 3/0482 715/702 |

FOREIGN PATENT DOCUMENTS

| | | |
|---|---|---|
| CN | 101162420 A | 4/2008 |
| CN | 201181467 Y | 1/2009 |
| CN | 101384047 A | 3/2009 |
| EP | 1 850 217 A2 | 10/2007 |
| EP | 1 942 401 A1 | 7/2008 |
| EP | 2 116 927 A2 | 11/2009 |
| GB | 2 358 336 A | 7/2001 |
| JP | 2001-069223 A | 3/2001 |
| JP | 2002-333951 A | 11/2002 |
| JP | 2003-140802 A | 5/2003 |
| JP | 2004-288208 A | 10/2004 |
| JP | 2005-196810 A | 7/2005 |
| JP | 2006-227844 A | 8/2006 |
| JP | 2008-084249 A | 4/2008 |
| KR | 10-2006-0057424 A | 5/2006 |
| KR | 10-2007-0080918 A | 8/2007 |
| KR | 10-0774927 B1 | 11/2007 |
| KR | 10-2007-0120368 A | 12/2007 |
| KR | 10-2007-0120569 A | 12/2007 |
| KR | 10-0849684 B1 | 7/2008 |
| KR | 10-2008-0076412 A | 8/2008 |
| KR | 10-2008-0109278 A | 12/2008 |
| KR | 10-2009-0032558 A | 4/2009 |
| KR | 10-2009-0035332 A | 4/2009 |
| KR | 10-2009-0116971 A | 11/2009 |
| WO | 2008-025473 A1 | 3/2008 |
| WO | 2008-030976 A2 | 3/2008 |

OTHER PUBLICATIONS

"Some of the Firefox Extension Functions that I'm Using Recently"; Firefox Expansion Features—2 Easy Gesture; Dec. 2008; http://egloos.zum.com/opensea/v/4783945.

(56) References Cited

OTHER PUBLICATIONS

"Wireframe Sooopd still in the twenties 20071209:: Firefox Extension—MouseGesture"; Dec. 2007, http://soooprmx.com/wp/archives/403.
IPod Touch User Guide, Sep. 9, 2008, https://manuals.info.apple.com,MANUALS/0/MA660/en_US/iPod_touch_2.2_Guide.pdf.
Apple; "iPhone 3G User Manual", Jul. 11, 2008; XP 007907619; Rtrvd from internet: http://manuals.info.apple.com/en_US/iPhone_User_Guide.pdf.

* cited by examiner

MOBILE DEVICE AND METHOD FOR EXECUTING PARTICULAR FUNCTION THROUGH TOUCH EVENT ON COMMUNICATION RELATED LIST

CROSS REFERENCE TO RELATED APPLICATIONS

This is a Continuation of U.S. patent application Ser. No. 12/781,923 filed on May 18, 2010 which claims the benefit of priority from Korean Patent Application No. 10-2009-0043414 filed in the Korean Intellectual Property Office on May 19, 2009, the contents of which are incorporated herein by reference in its entirety.

BACKGROUND

1. Field of the Invention

The present invention relates in general to a mobile device and a method for executing pre-programmed functions therein. More particularly, the present invention relates to a particular function predefined in a selected one of items arranged in a scrollable communication-related list when a touch event is invoked on a touch screen of such a mobile device.

2. Description of the Related Art

Nowadays, a mobile device supports a great variety of user-friendly functions to meet customer's increasing demands regarding the number of mobility-based functions. Such a mobile device today has become widely used owing to its convenience in use and easy portability.

Such mobile devices may adopt various input techniques. For example, a conventional mobile device has in general a traditional keypad which is mechanically disposed near a display unit on the front side of a body. Additionally, a more recent conventional mobile devices have a limited size for enhancing portability and often employs a touch screen in which a touch panel used instead of a keypad is disposed on a display unit.

In addition, a user who wishes to access one of the communication-related functions in a conventional mobile device often has to pass through several screen pages with different depths displayed on a screen before being able to select the screen or function or desired. For instance, a user who wants to call someone has to open a page for searching a phonebook, enter a page for viewing detailed information about a selected recipient, and then enter a page for executing a call function or launch an associated menu list. Unfortunately, this may sometimes cause inconvenience to a user.

SUMMARY

Accordingly, the present invention provides a mobile device with a touch-sensitive interface and also a touch-based operation method thereof, allowing a user to easily and conveniently use a desired communication-related function through the touch-sensitive interface.

According to one exemplary aspect of the present invention, a method for touch-based operation in a mobile device preferably comprises: displaying a scrollable communication-related list having at least one item; selecting a specific one of the at least one item in response to a first touch event; determining whether a second touch event occurs on the selected specific one item in a non-scrollable direction; and executing a particular function predefined in the selected specific one item in response to the second touch event occurring in the non-scrollable direction.

According to another exemplary aspect of the present invention, provided is a mobile device preferably comprising: a touch panel configured to create a touch event in response to a user's touch; a display unit having a list region in which a scrollable communication-related list having at least one item is displayed; and a control unit configured for controlling a variation in an image of the item displayed in the display unit, wherein the control unit is further configured to select a specific one of the at least one item in response to a touchdown event, and to execute a particular function predefined in the selected item in response to a drag or sweep event occurring on the selected item in a non-scrollable direction.

Therefore, as will be shown by some of the exemplary aspects of the present invention provided herein, a user can easily select one of items arranged in a scrollable communication-related list through a first touch event and then quickly use a particular function predefined in the selected item through a subsequent touch event without requiring any additional page or menu.

Other exemplary aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary aspects, features, and advantages of certain exemplary embodiments of the present invention will become more apparent from the following description taken in conjunction with the accompanying drawings, in which.

DETAILED DESCRIPTION

Exemplary, non-limiting embodiments of the present invention will now be described more fully with reference to the accompanying drawings. The present invention may, however, be embodied in many different forms and the appended claim are in no way limited to the exemplary embodiments set forth herein. Rather, the disclosed exemplary embodiments are provided so that this disclosure will be thorough and complete, and will fully convey the scope of the invention to those skilled in the art. The principles and features of the present invention may be employed in varied and numerous exemplary embodiments without departing from the scope of the invention.

Furthermore, well-known or widely used techniques, elements, structures, and processes may not be described or illustrated in detail to avoid obscuring appreciation of the present invention by a person of ordinary skill in the art. Although the drawings represent exemplary embodiments of the invention, the drawings are not necessarily to scale and certain features may be exaggerated or omitted in order to better illustrate and explain the present invention.

Figure 1:
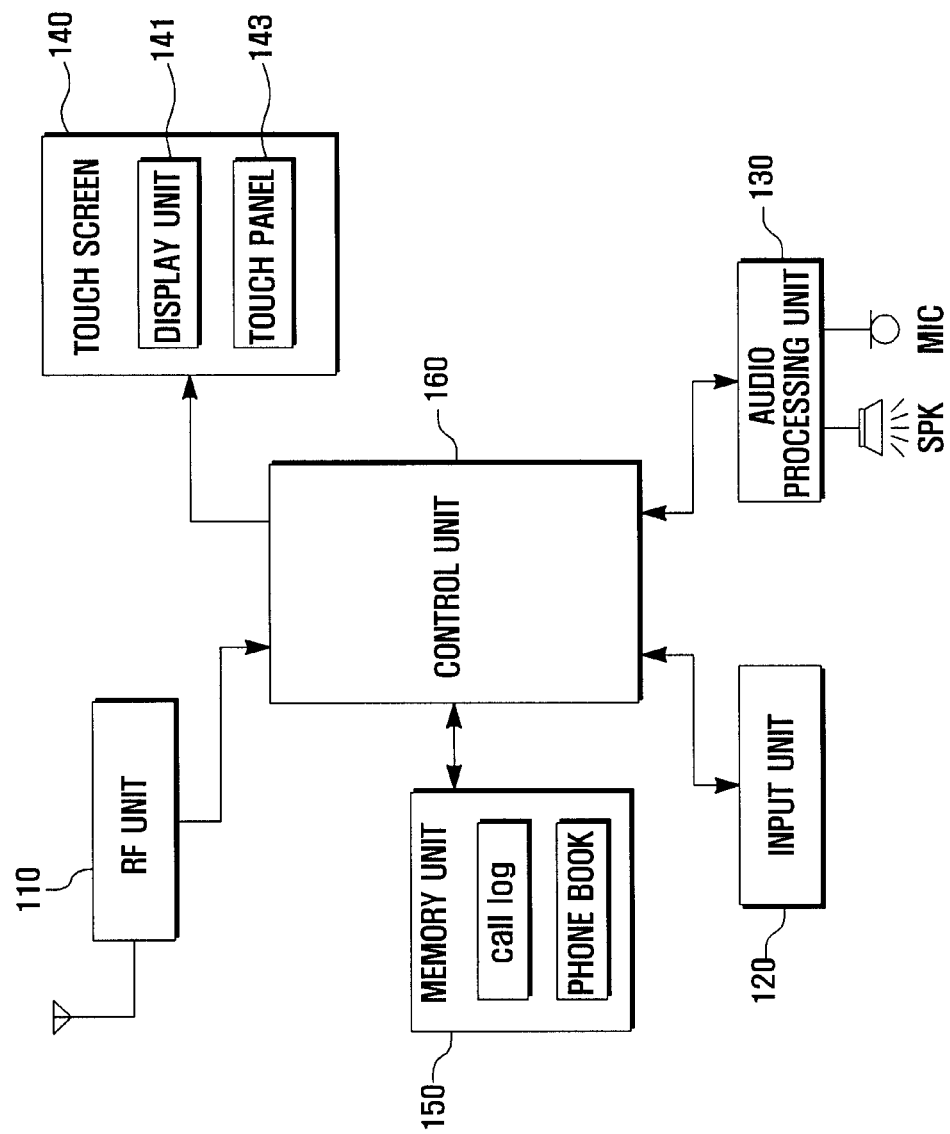
FIG. 1 is a block diagram illustrating the configuration of a mobile device in accordance with an exemplary embodiment of the present invention.

FIG. 1 is a block diagram illustrating the configuration of a mobile device in accordance with an exemplary embodiment of the present invention.

Referring now to FIG. 1, the mobile device includes a radio frequency (RF) unit 110, an input unit 120, an audio processing unit 130, a touch screen 140, a memory unit 150, and a control unit 160.

The mobile device having the above elements allows execution of a particular function predefined in a selected one of items arranged in a scrollable communication-related list, without requiring any additional page views, when a user invokes a touch event on the selected item in a non-scrollable direction. In particular, executable functions predefined in the respective items of the communication-related list may include a call function based on a call log or phonebook, a message function based on a message list or phonebook, an email function based on an email list or phonebook, and the like. Such executable functions may be selectively defined or, for example, changed by a user or manufacturer. For this reason, the mobile device may separately offer an edit menu and page for setting the executable functions in the respective items. Now, each element of the mobile device will be described in more detail.

The RF unit 110 establishes the necessary communication channels under the control of the control unit 160. Namely, the RF unit 110 forms a voice call channel, a video call channel, and a data communication channel with a mobile communication system. The RF unit 110 may include an RF transmitter which upwardly converts the frequency of signals to be transmitted and amplifies the signals, and an RF receiver which amplifies received signals with low-noise and downwardly converts the frequency of the received signals. The RF unit 110 may be selectively enabled under the control of the control unit 160, depending on a touch event invoked on a touch panel 143 of the touch screen 140.

Particularly, in an exemplary embodiment of the present invention, some functions executable based on the RF unit 110 may be represented as menu icons, images or any other graphical elements. If these aforementioned functions, together with other functions of the mobile device, are displayed in the form of a list, such functions may be selected and executed through a user's touch event. Namely, when a menu page contains some graphical elements indicating functions based on the RF unit 110 and other kinds of functions, the mobile device executes a particular function based on the RF unit 110 by depending on a given touch event invoked on a selected graphical element in a non-scrollable direction. Here, in connection with functions based on the RF unit 110, the mobile device may offer, on a screen, various required pages such as a phonebook page, a message writing page, an email writing page, a call log page, a received message page, and the like.

The input unit 120 includes a plurality of normal input keys and special function keys, both of which are configured to receive user's instructions. The function keys may have navigation keys, side keys, shortcut keys, and any other special keys. The input unit 120 creates various key signals in association with user's instructions and delivers them to the control unit 160. The input unit 120 may be formed of a QWERTY keypad, a 3 by 4 keypad, a 4 by 3 keypad, a Dvorak keypad, etc. each of which has a plurality of keys. In some exemplary embodiments, the input unit 120 may be omitted and replaced with the touch screen 140 if the touch screen 140 is made in the form of full touch screen.

The audio processing unit 130 preferably includes a speaker (SPK) for outputting audio signals and a microphone (MIC) for receiving audio signals. When images or pages displayed for a user interface are changed or altered, the audio processing unit 130 may output given specific audio signals, which may be preset by a manufacturer or newly set or modified by a user.

Particularly, the audio processing unit 130 may output any specific audio signal associated with the execution of a selected function. Namely, when a user invokes a touch event on a selected item of a communication-related list in a non-scrollable direction, the audio processing unit 130 may output a given audio signal to inform a user about a selected function to be executed by a user's touch event. For instance, when a touch drag event occurs on a selected item in a leftward direction, the audio processing unit 130 may output an audio signal informing "dialing", for example, predefined in a selected item under the control of the control unit 160.

Still referring to FIG. 1, the touch screen 140 includes a display unit 141 and a touch panel 143. Typically the touch panel 143 is disposed at the entire front of the display unit 141. The size of the touch screen 140 may depend on the particular touch panel 143.

The display unit 141 represents a variety of information on a screen in association with the operation of the mobile device. For instance, the display unit 141 may offer various screens such as a home screen or an idle screen, a menu screen, a call screen, a message screen, etc.

More particularly, the display unit 141 according to an exemplary embodiment of the present invention outputs a scrollable communication-related list having at least one item. Additionally, the display unit 141 may offer, on a screen, a visual feedback caused by a selection of a specific item from the communication-related list, a variation in an image of a selected item in response to the occurrence of a touch event, a background effect depending on such image variations, an image showing the execution of a particular function in a selected item, and the like. Meanwhile, the display unit 141 may be formed of a liquid crystal display (LCD), an organic light emitting device (OLED), or any other type of thin-film technology screens. The display unit 141 may have a smaller size than the size of the touch panel 143 and may be disposed under the touch panel 143. It is also possible that the touch screen and display screen completely or partially overlap.

The touch panel 143 is configured to cover the display unit 141. Also, the touch panel 143 creates a touch event according to the touch or proximity of an object such as a user's finger (or a stylus-pen) and then delivers a created touch event to the control unit 160. The touch panel 143 may be composed of touch sensors arranged in the form of matrix. With regard to a specific touch event, the touch panel 143 sends information about a location and a type of a touch event to the control unit 160. Types of a touch event may include a touchdown event which occurs by a contact of an object on the touch panel, a touchup or touch release event which occurs by a release of a contact from the touch panel, a sweep or touch drag event which occurs by a movement of a contact on the touch panel, a flick event which occurs by a quick and accelerated movement of a contact, and the like. When the touch panel 143 sends a touch event to the control unit 160, the control unit 160 checks information about the location and type of a received touch event, checks a displayed image mapped with the location of a touch event, and then activates a particular function linked to the displayed image.

With continued reference to FIG. 1, the memory unit 150 stores a variety of applications and data required for the operation of the mobile device, including a key map or a menu map for the operation of the touch screen 140. Here, such a key map or a menu map may be provided in various forms. Namely, the key map may comprise, for example, a keyboard map, a 3*4 key map, a QWERTY key map, a Dvorak keymap, or the like. Additionally, the key map may include a control key map suitable for the operation of a currently activated application. Also, the menu map may comprise a specific menu map suitable for the operation of a currently activated application or another menu map having various menu items used for the mobile device. The memory unit 150 may include a program region and a data region.

The program region may also store an operating system (OS) for booting the mobile device and for operating the aforesaid elements, an application for supporting a call function, a web browser for supporting the access to an Internet server, an application for playing a music file, an application for displaying an image file, an application for playing a video file, and the like, just to name a few possibilities.

Particularly, the program region according to an exemplary embodiment of the present invention may store a touch-based operation application for supporting touch related functions. This touch-based operation application may include a control routine for controlling the scroll of a communication-related list when a user invokes the first kind of a touch event in the first direction for example a scrollable direction, a control routine for controlling the execution of a particular function defined in items arranged in the communication-related list when a user invokes the second kind of a touch event in the second direction for example a non-scrollable direction, and any other required control routines. Additionally, the program region may include a routine for varying an image of a selected item in response to the occurrence of a touch event.

The data region preferably stores data created while the mobile device is used. Specifically, the data region may store user data associated with various optional functions the mobile device offers, including phonebook data, at least one icon associated with a widget function, a great variety of contents, etc. Also, the data region may also store input data received from a user through the touch screen 140.

Particularly, the data region according to an exemplary embodiment of the present invention may store a mapping table which defines relations among items arranged in a communication-related list, executable functions assigned to the respective items, the type of touch events to occur on the items, and a particular function to be executed depending on the occurrence of a touch event. For instance, each item in the communication-related list may be linked to at least one function of "a voice call dialing", a message writing", "an email writing", "a video call dialing", and "an item deleting".

With continued reference to FIG. 1, the control unit 160 performs an overall control function related to the mobile device and controls the flow of signals between elements in the mobile device. Specifically, when a scrollable communication-related list having at least one item is displayed in the display unit 141 and also a given touch event occurs on a selected item in a non-scrollable direction, the control unit 160 reads a mapping table stored in the data region of the memory unit 150. Then the control unit 160 retrieves information about a particular function assigned to the selected item and the touch event from the table. Thus, the control unit 160 may offer suitable information in various forms of text, graphic, and/or sound and to inform a user about a selected function to be executed by a user's touch event. Thereafter, when a touch event exceeds a critical point for activating a selected function, the control unit 160 executes a selected function. Here, the control unit 160 may also offer given graphic effects in connection with the execution of a selected function.

Figure 2:
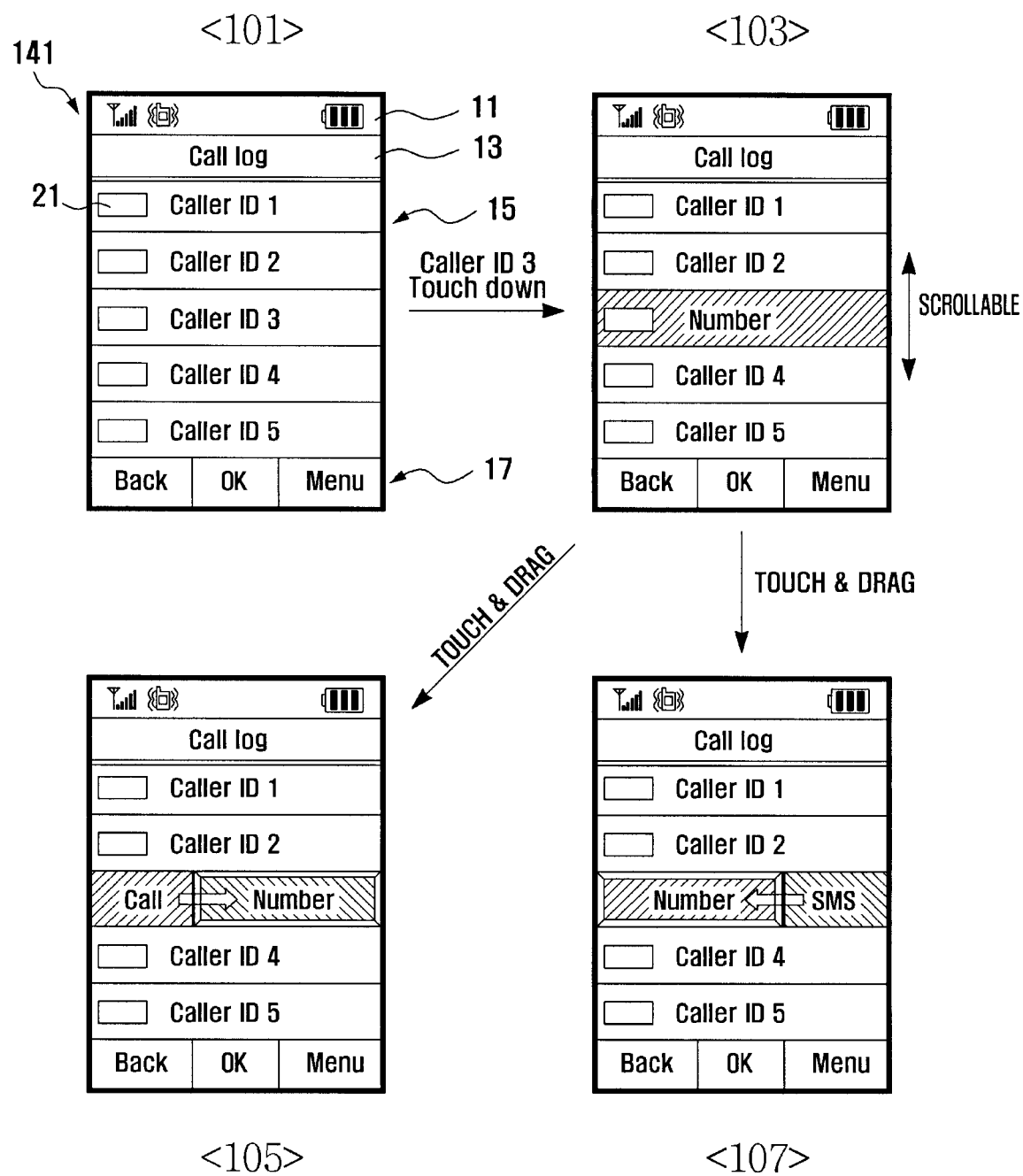
FIG. 2 is an example view illustrating a touch-based operation method in a mobile device in accordance with the first exemplary embodiment of the present invention.

FIG. 2 is an example view illustrating a touch-based operation method in a mobile device in accordance with the first exemplary embodiment of the present invention. In other words, FIG. 2 shows a user interface based on a call log and also a touch-based process of executing a particular function.

Referring now to FIG. 2, as shown in the first screen 101, the display unit 141 may include an indicator region 11, a title region 13, a list region 15, and a control key region 17.

The indicator region 11 outputs several icons indicating the state of the mobile device. For instance, the indicator region 11 may contain an icon indicating the strength of received signals in the RF unit, an icon indicating a mute mode, an icon indicating the usable amount of battery, and the like.

The title region 13 outputs the title of a communication-related list displayed in the list region 15. In an example of FIG. 2, the title region 13 identifies a list displayed in the list region 15 is a call log.

The list region 15 outputs at least one item of a communication-related list having a title shown in the title region 13. Namely, if the title region 13 displays a call log, the list region 15 shows detailed items of call occurrence each of which is represented as a caller ID in FIG. 2. These items may be sorted or arranged according to their types such as a dialed call, a received call, a missed call, and the like. In addition, the list region 15 may further output a prefix box 21 at each item as shown in the drawings. The prefix box 21 may show specific icons indicating the types of items or alternatively show pictures of caller IDs.

The control key region 17 may display an output of a back key, an OK key and a menu key, for example. The back key is used to instruct a return to the previous page. The OK key is used to instruct the activation of a given function, such as a view of detailed information, subsequent to the selection of an item. The menu key is used, for example, to instruct unfolding of a menu list. The control key region 17 may be removed or partially available according to a manufacturer's intention or a user's setting.

As mentioned above, the list region 15 arranges a number of items, for example, "Caller ID 1, Caller ID 2, Caller ID 3, Caller ID 4, and Caller ID 5" as shown. Normally the list region 15 may offer a scroll function to move vertically such items across the screen. In order to scroll a displayed list, a user may touch an arbitrary place (for example, "Caller ID 3" as shown) and then drag in the first direction for example a scrollable direction, a vertical direction as shown, without releasing a touch from the screen.

Also, a user may intentionally select a specific item (for example, "Caller ID 3") as shown in the second screen 103 in order to activate one of functions defined in that item. Namely, a user who wishes to select a specific one of items may invoke the first touch event such as a touchdown event on that item. Then the mobile device may offer a visual feedback to a user in order to indicate the selection of a specific item. For instance, an image of a selected item is represented as a distinctive color or the reverse color, and/or highlighted.

If the mobile device has a typical keypad such as 3×4, 4×3, QWERTY or DVORAK, a user may select a specific item by using a navigation key or numerical key of the keypad. Meanwhile, the mobile device may change displayed information about a selected item. Namely, "Caller ID 3" representing a specific item in the first screen 101 before selected is changed to "Number" of that item in the second screen 103 after selected. For instance, "Caller ID 3" may be "John", and "Number" may be John's phone number recorded in the phonebook. Alternatively, if "Caller ID 3" is a phone number of a certain recipient, "Number" may be any other index of that recipient recorded in the phonebook. Sometimes a certain item in a displayed list may not be recorded in the phonebook. Such an item remains unchanged after being selected.

After selecting a specific item, a user may invoke the second touch event to scroll a displayed list as mentioned above. Namely, as shown in the second screen 103, a user who performs a touchdown event on a certain item (for example, "Caller ID 3" as shown) may move a touch point upward or downward in the list region 15. Then the mobile device recognizes this drag event as an input signal for a scroll, and hence changes the display on the list region 15. Namely, if any additional items not displayed in the list region 15 exist in a list, such items may appear one by one through a scroll. While a list is scrolled, the mobile device may remove a visual feedback indicating the selection of a specific item. Namely, an image of a selected item is represented as an original color or not highlighted when a scroll is performed.

A touch event for performing a scroll function is not limited to the aforesaid touch and drag. Alternatively, a scroll function may be performed, for example, by means of a flick event. Meanwhile, the movement of a list by a scroll may depend on a traveling distance of a drag event or an acceleration magnitude of a flick event, and also may be fixed or changed by a design rule or a user's setting.

With continued reference to FIG. 2, after selecting a specific item (for example, "Caller ID 3") as shown in the second screen 103, a user who wishes to use a particular function may invoke the second touch event on a selected item in the second direction for example a non-scrollable direction as shown in the third or fourth screen 105 or 107. For instance, if a user sweeps or drags a touched item in a rightward direction, the mobile device moves the touched item to the right as shown in the third screen 105. Then the mobile device outputs information about a specific executable function (for example, "Call" as shown) assigned to a rightward touch event on this item "Caller ID 3" in the form of text or image at the left of the moved item. Thereafter, when this touch event exceeds a given critical point, the mobile device may execute a selected function.

Alternatively, if a user sweeps or drags a touched item in a leftward direction, the mobile device moves the touched item to the left as shown in the fourth screen 107. Then the mobile device outputs information about a specific executable function (for example, "SMS" as shown) assigned to a leftward touch event on this item "Caller ID 3" in the form of text or image at the right of the moved item. Thereafter, when this touch event exceeds a given critical point, the mobile device may execute a selected function.

Meanwhile, when a user sweeps or drags a touched item, the mobile device may offer a visual feedback for the appearing particular function as well as the touched and moved item as shown in the third and fourth screens 105 and 107. Also, when offering a visual feedback for the particular function appearing at the left or right of the moved item, the mobile device may often use the same color and form. However, different colors and forms may be sometimes used to enhance an intuitive distinction between different functions respectively assigned to leftward and rightward touch events.

As fully discussed hereinbefore, the mobile device according to an exemplary embodiment of the present invention allows executing a particular function predefined in a selected one of items arranged in a scrollable communication-related list, without requiring any additional page view, when a user invokes a touch event on the selected item in a non-scrollable direction, which in the case would be a least to the left and to the right. Therefore, a user can easily select an item and quickly use a desired function on a single screen without requiring any additional page or input.

Figure 3:
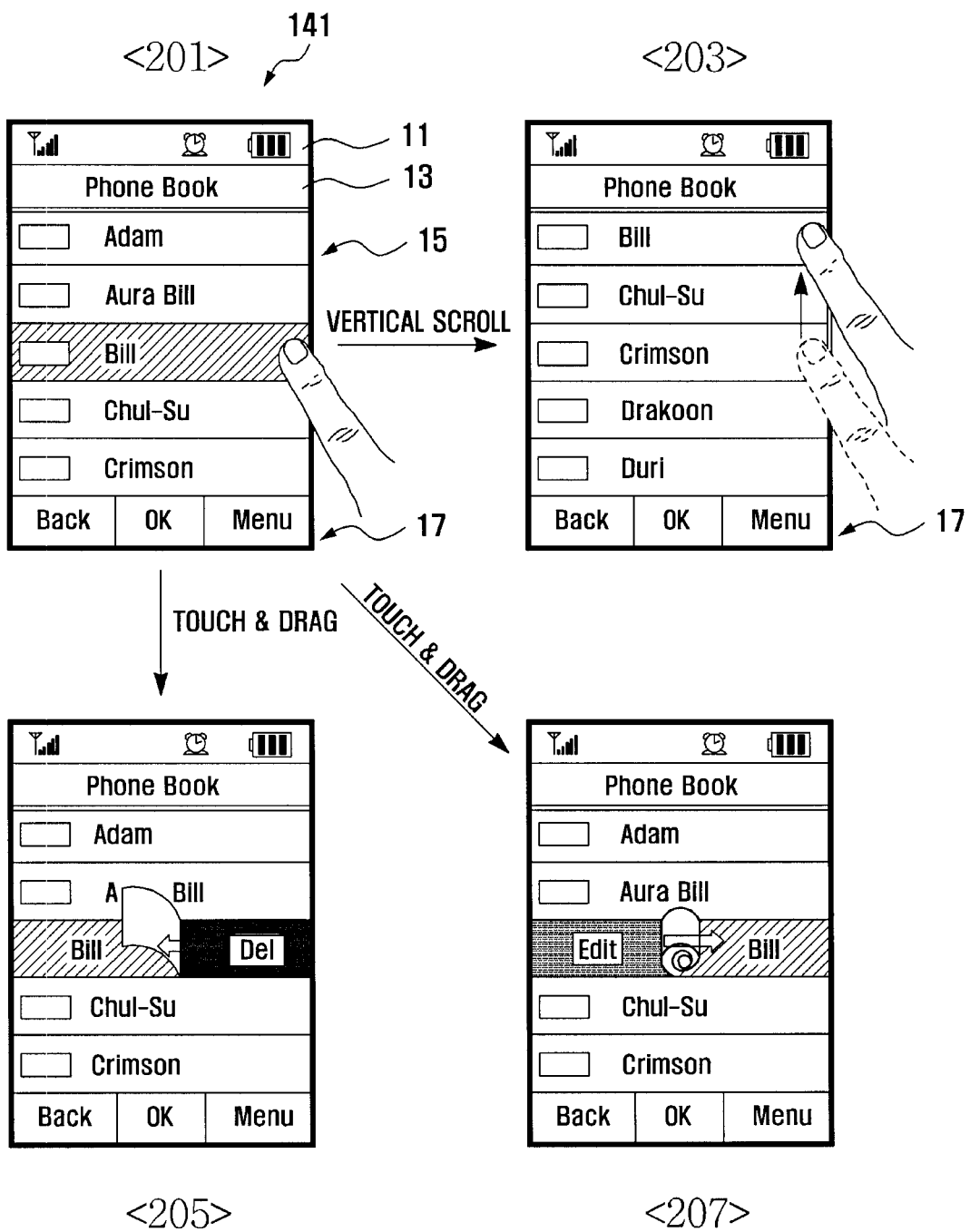
FIG. 3 is an example view illustrating a touch-based operation method in a mobile device in accordance with the second exemplary embodiment of the present invention.

FIG. 3 is an example view illustrating a touch-based operation method in a mobile device in accordance with the second exemplary embodiment of the present invention. In other words, FIG. 3 shows a user interface based on a phonebook and also a touch-based process of executing a particular function.

Referring now to FIG. 3, as shown in the first screen 201, the display unit 141 may include an indicator region 11, a title region 13, a list region 15, and a control key region 17. Since the indicator region 11 and the control key region 17 are the same as those described in FIG. 2, descriptions about them will be omitted herein.

The title region 13 displays an output of the title of a communication-related list displayed in the list region 15. In an example of FIG. 3, the title region 13 tells that a list displayed in the list region 15 is a phonebook.

The list region 15 outputs at least one item of a communication-related list having a title shown in the title region 13. Namely, if the title region 13 shows a phonebook, the list region 15 shows detailed items of a phonebook, such as a recipient's name, phone number, picture, communication history, and the like. FIG. 3 shows recipients' names arranged as items. These items may be sorted or arranged according to the alphabet, a phone number, and the like. In addition, each item may have a prefix box for outputting a resized image of a recipient's picture.

As mentioned above, the list region 15 may arrange recipients' names, for example, "Adam, Aura Bill, Bill, Chul-su, and Crimson" as shown. Normally the list region 15 may offer a scroll function to move vertically such items across the screen. In order to scroll a displayed list, a user may touch an arbitrary place (for example, "Bill" as shown) and then drag in a scrollable direction (for example, a vertical direction as shown) without releasing a touch from the screen.

For instance, if a user invokes a touch and drag event in an upward direction as shown in the second screen 203, the mobile device displays an upwardly scrolled phonebook list. That is, some items "Adam, Aura Bill" disappear from the screen, and instead other items "Drakoon, Duri" appear on the screen. While a list is scrolled, the mobile device may remove a visual feedback indicating a touched item (for example, "Bill" in the first screen 201). Namely, an image of a selected item is represented as an original color or not highlighted when a scroll is performed.

Meanwhile, when a user touches a specific item (for example, "Bill") as shown in the first screen 201, the mobile device may offer a visual feedback to a user in order to indicate the selection of a specific item. For instance, an image of a selected item "Bill" is represented as a distinctive color or the reverse color, or highlighted. If the mobile device has a normal keypad, a user may select a specific item by using a navigation key or numerical key of the keypad. There can also be a pulsating or flashing background.

A touch event for performing a scroll function is not limited to the aforesaid touch and drag. Alternatively, a scroll function may be performed by means of a flick event. Meanwhile, the movement of a list by a scroll may depend on a traveling distance of a drag event or an acceleration magnitude of a flick event, and also may be fixed or changed by a design rule or a user's setting.

With continued reference to FIG. 3, after selecting a specific item (for example, "Bill") as shown in the first screen 201, a user who wishes to use a particular function may invoke the second touch event on a selected item in a non-scrollable direction as shown in the third or fourth screen 205 or 207. For instance, if a user sweeps or drags a touched item in a leftward direction, the mobile device moves the touched item to the left as shown in the third screen 205. Then the mobile device outputs information about a specific executable function (for example, "Delete" as shown) assigned to a leftward touch event on this item "Bill" in the form of text or image at the right of the moved item. Thereafter, when this touch event exceeds a given critical point, the mobile device may execute a selected function.

Specifically, when the touched item "Bill" is moved, the mobile device may offer a visual feedback such as turning over a page or stripping off a narrow adhesive tape as shown in the third screen 205. Therefore, as the right edge of the touched item is moved to the left, the remaining portion of the touched item may appear to be reduced. Here, such visualization may be modified in various forms. Also, the movement of the right edge of the touched item may depend on the touch and drag or sweep event. Namely, a traveling distance and speed of the right edge of the touched item may be varied according to the distance and speed of a drag or sweep action.

On the other hand, if a user sweeps or drags a touched item "Bill" in a rightward direction, the mobile device moves the touched item to the right as shown in the roll in fourth screen 207. Then the mobile device outputs information about a specific executable function (for example, "Edit" as shown) assigned to a rightward touch event on this item "Bill" in the form of text or image at the left of the moved item. Thereafter, when this touch event exceeds a given critical point, the mobile device may execute a selected function.

Specifically, when the touched item "Bill" is moved, the mobile device may offer a visual feedback as if the left edge of the touched item is rolled as shown in the fourth screen 207. Therefore, as the left edge of the touched item is moved to the right, the remaining portion of the touched item may appear to be reduced. Here, such visualization may be modified in various forms.

Meanwhile, when a user sweeps or drags a touched item, the mobile device may also offer a visual feedback for the appearing particular function as well as the touched and moved item as shown in the third and fourth screens 205 and 207. When offering a visual feedback for the particular function appearing at the left or right of the moved item, the mobile device may often use the same color and form. However, different colors and forms may be sometimes used to enhance an intuitive distinction between different functions respectively assigned to leftward and rightward touch events.

Although FIGS. 2 and 3 uses "Call", "SMS", "Delete" and "Edit" as specific executable functions predefined in a selected item, these terms are exemplary only and not to be considered as a limitation of the presently claimed invention. Any other executable functions may also be assigned to respective items and may, if necessary, be changed by a user.

Figure 4:
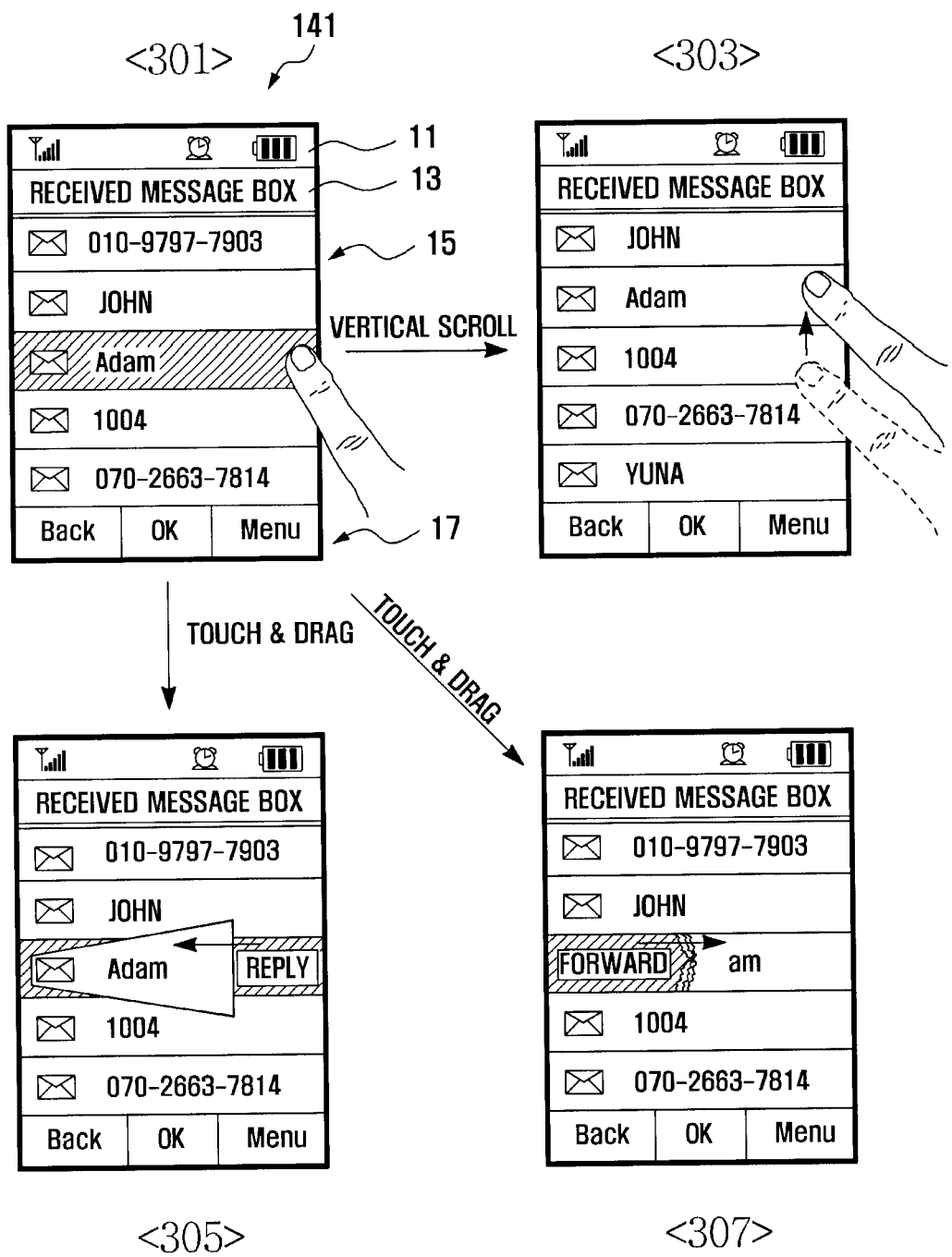
FIG. 4 is an example view illustrating a touch-based operation method in a mobile device in accordance with the third exemplary embodiment of the present invention.

FIG. 4 is an exemplary view illustrating a touch-based operation method in a mobile device in accordance with the third exemplary embodiment of the present invention. In other words, FIG. 4 shows a user interface based on a message list and also a touch-based process of executing a particular function.

Referring now to FIG. 4, as shown in the first screen 301, the display unit 141 may include an indicator region 11, a title region 13, a list region 15, and a control key region 17, all of which were previously described herein.

The title region 13 outputs the title of a communication-related list displayed in the list region 15. In an example of FIG. 4, the title region 13 identifies that a list displayed in the list region 15 is a received message box. In this case, a transmitted message box or an all message box may be alternatively used in the title region 13.

The list region 15 outputs at least one item of a communication-related list having a title shown in the title region 13. Namely, if the title region 13 displays the indication of a received message box, the list region 15 shows detailed items in the received message box, namely, received messages. These items may be sorted or arranged according to the receiving order and the like. In addition, each item may have a prefix box for outputting an envelope-like icon indicating a received message.

As mentioned above, the list region 15 may arrange information about received messages, for example, "010-9797-7903, John, Adam, 1004, and 070-2663-7814" as shown. If a sender of a received message is recorded in the phonebook, information output in the list region 15 may be a specific index, for example, such as a sender's name recorded in the phonebook. In this example, "John, Adam" are senders recorded in the phonebook. If a sender of a received message is not recorded in the phonebook, information outputted in the list region 15 may be just a phone number.

As discussed above, the list region 15 may offer a scroll function to move such items vertically across the screen. In order to scroll a displayed list, a user may touch an arbitrary place (for example, "Adam" as shown) and then drag in a scrollable direction (for example, a vertical direction as shown) without releasing a touch from the screen.

For instance, if a user invokes a touch and drag event in an upward direction as shown in the second screen 303, the mobile device displays an upwardly scrolled list. That is, some item "010-9797-7903" shown in screen 301 disappears from the second screen 303, and instead another item "Yuna" appears on the screen. While a list is scrolled, the mobile device may remove a visual feedback indicating a touched item (for example, "Adam" in the first screen 301). Namely, an image of a selected item is represented as an original color or not highlighted when a scroll is performed.

Meanwhile, when a user touches a specific item (for example, "Adam") as shown in the first screen 301, the mobile device may offer a visual feedback to a user in order to indicate the selection of a specific item. For instance, an image of a selected item "Adam" can be represented as a distinctive color, brightness, flash, or the reverse color, change size, or become highlighted, etc., just to name a few possibilities. If the mobile device has a normal keypad, a user may select a specific item by using a navigation key or numerical key of the keypad.

A touch event for performing a scroll function is not limited to the aforesaid touch and drag. Alternatively, for example, a scroll function may be performed by means of a flick event. Meanwhile, the movement of a list by a scroll may depend on a traveling distance of a drag event or an acceleration magnitude of a flick event, and also may be fixed or changed by a design rule or a user's setting.

After selecting a specific item (for example, "Adam") as shown in the first screen 301 of FIG. 4, a user who wishes to use a particular function may invoke the second touch event on a selected item in a non-scrollable direction as shown in the third or fourth screen 305 or 307. For instance, if a user sweeps or drags a touched item in a leftward direction, the mobile device moves the touched item to the left as shown in the third screen 305. Then the mobile device outputs information about a specific executable function (for example, "Reply" as shown) assigned to a leftward touch event on this item "Adam" in the form of text or image at the right of the moved item. Thereafter, when this touch event exceeds a given critical point, the mobile device may execute a selected function.

More specifically, when the touched item "Adam" is moved, the mobile device may offer a visual feedback as if an image of the touched item is rotated as shown in the third screen 305. Namely, the left part of an item image is turned toward the backside, and the right part is turned toward the front side. Additionally, such a rotation may be represented in perspective. Here, such visualization may be modified in various forms.

In particular, when a rotation exceeds a given angle such as, for example, about 60 degrees, the mobile device may execute a selected function "Replay". Also, a rotating amount of an item image may depend on the distance and speed of a drag or sweep action. If a touch is released before a rotation reaches a given angle, an image of the touched item may be returned to an original image.

Alternatively, when a touch release event occurs, the mobile device may maintain the appearance of an executable function. In this case, if a user touches a portion of an executable function, the mobile device may execute a selected function. In another case, the mobile device may offer information about an executable function in the form of button or the like.

On the other hand, if a user sweeps or drags a touched item "Adam" in a rightward direction, the mobile device moves the touched item to the right as shown in the fourth screen 307. Then the mobile device outputs information about a specific executable function (for example, "Forward" as shown) assigned to a rightward touch event on this item "Adam" in the form of text or image at the left of the moved item. Thereafter, when this touch event exceeds a given critical point, the mobile device may execute a selected function.

In addition, when the touched item "Adam" is moved, the mobile device may offer a visual feedback as if an image of the touched item is removed partly and gradually as shown in the fourth screen 307. Namely, an item image begins to disappear from the right part. Therefore the right edge of the item image is moved toward the leftward the front side, while information about an executable function appears gradually. Here, such visualization may be modified in various forms, and the present claims are not limited to the examples shown and described herein.

Meanwhile, as mentioned above, a particular function assigned to a selected item is executed when a drag or sweep event exceeds a given critical point in a call log list, a phonebook list, or a message list. Specifically, the mobile device may execute a particular function as soon as a drag or sweep event goes beyond a critical point or when a touch release event occurs after going beyond a critical point. Such a critical point may be changed depending on a variation in an item image or the location of a touch event.

A critical point may be set to any position in the touched item or to the left and right boundaries of the touched item. If the touched item is rotated, a critical point may be set to a rotation axis. Also, a critical point may be further shifted from the location of a touchdown event or fixed regardless of the location of a touchdown event.

Meanwhile, in some cases, the mobile device may change a feedback image offered to indicate a drag or sweep event as it takes place. For instance, if a drag or sweep event deviates from a non-scrollable direction or is released from the screen in the middle of the travel before reaching a critical point, the mobile device may remove a feedback image and instead display an original image. Additionally, even though going beyond a critical point, a drag or sweep event deviating from a non-scrollable direction may not cause the execution of a particular function.

In other words, the mobile device may remove a feedback image, i.e., image variation effect, in at least one of cases where a drag or sweep event is released prior to passage through a critical point, where a drag or sweep event is released after passing through a critical point, where a drag or sweep event deviates from a non-scrollable direction before passing through a critical point, and where a drag or sweep event deviates from a non-scrollable direction after passing through a critical point.

Also, when a specific one of items arranged in a communication-related list is selected, the mobile device may inform a user, in the form of a visual or any other manner, whether a selected item is mapped with any executable function. For instance, if a user invokes a touchdown event to select a specific item having at least one executable function assigned thereto, the mobile device may offer a given graphic effect, such as a highlight or rightward and leftward indicators, indicating that a selected item is available for the execution of a predefined function.

However, if a selected item (for example, a phone number) is unavailable for the execution of any function, the mobile device may offer a suitable graphic effect such as a dashed line on the border of a selected item or an image indicating no executable function. In some cases, if a selected item has no communication executable function, such as a call dialing function, or a message writing function, the mobile device may offer a "delete" function only to that item. Additionally, the mobile device may ascertain whether a selected phone number is valid or predefined. Namely, if a selected phone number is an incomplete number such as "1004" or "7979" or has a given prefix number such as "070-xxx-xxxx", the mobile device may automatically set a given particular function to that number.

Figure 5:
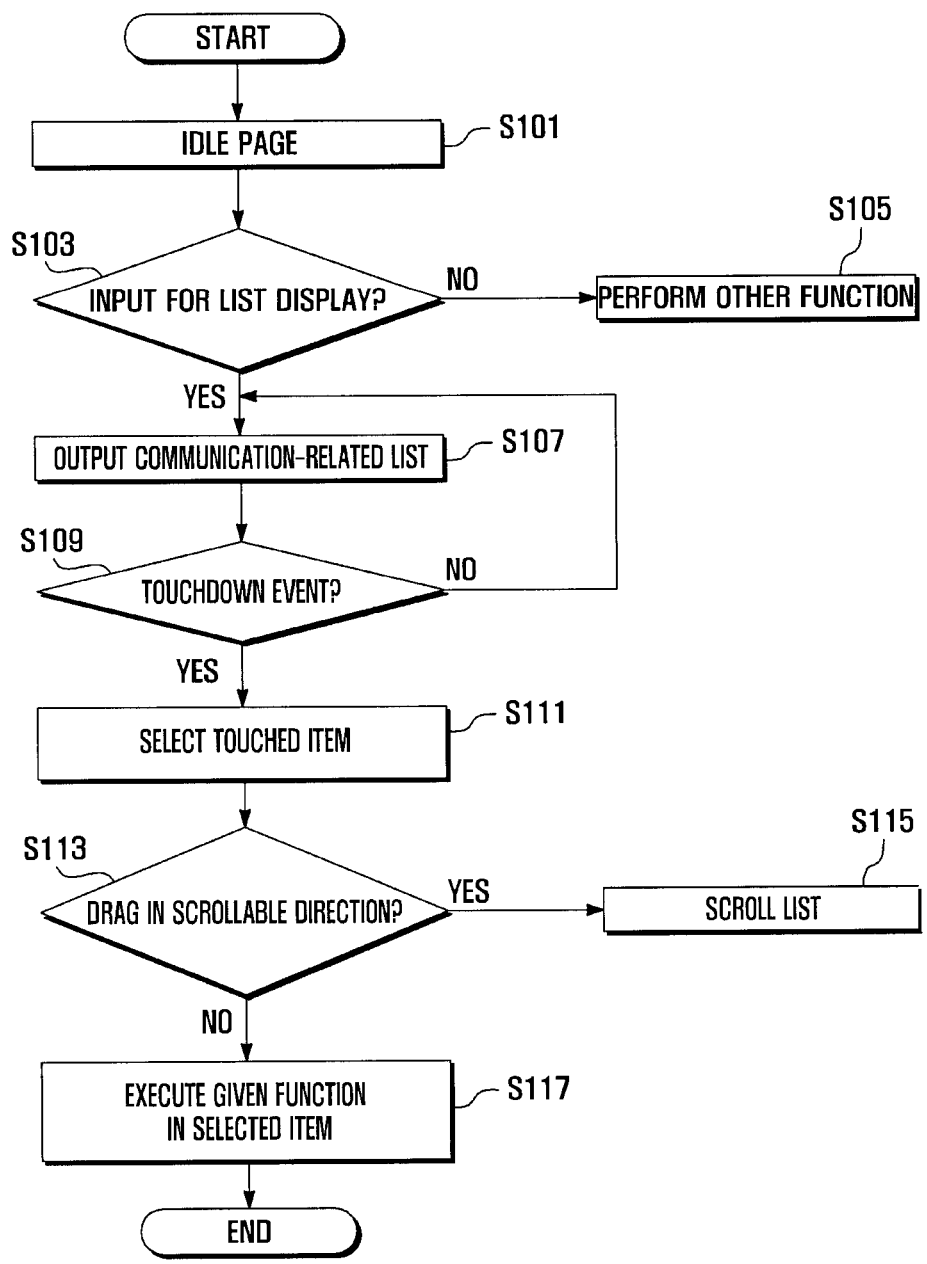
FIG. 5 is a flow diagram illustrating a touch-based operation method in a mobile device in accordance with an exemplary embodiment of the present invention.

FIG. 5 is a flow diagram illustrating a touch-based operation method in a mobile device in accordance with an exemplary embodiment of the present invention.

Referring now to FIG. 5, at step (S101) when electric power is supplied, the mobile device initializes its elements and outputs a given idle page on the display unit. Additionally, the mobile device activates the touch panel of the display unit to detect a user's touch.

Next, at step (S103) a mobile device determines whether or not an input signal for displaying a communication-related list is received. If any other input signal is received, then at step (S105) the mobile device performs other function, such as a file play or a broadcast reception, in response to the received input signal.

If the received input signal is to display a communication-related list, then at step (S107) the mobile device outputs a suitable list, such as a call log list, a phonebook list, a message list, an email list, a messenger list, or the like, in response to the received input signal. Then at step (S109), the mobile device determines whether a touchdown event occurs on a selected one of items arranged in the communication-related list. If no touchdown event occurs, the mobile device maintains the previous step S107. However, if a touchdown event occurs, then at step (S111) the mobile device selects the touched item and also offers a visual feedback for the selected item.

Next, at step (S113), the mobile device determines whether a subsequent touch event such as a drag or sweep event occurs in a scrollable direction without releasing a touch.

If such a drag or sweep event occurs in a scrollable direction, then at step (S115) the mobile device scrolls the communication-related list in response to the drag or sweep event.

However, at step (S117), if such a drag or sweep event occurs in a non-scrollable direction, the mobile device executes a particular function predefined in the selected item in response to the direction of the drag or sweep event and the type of the communication-related list. As discussed above, predefined functions in connection with items may include a call dialing, a message writing, an email writing, a text writing for messenger, an item deleting, and a given information delivery.

The above-described methods according to the present invention can be realized in hardware or via the execution of software or computer code that can be stored in a recording medium such as a CD ROM, a RAM, thumbnail drive, a floppy disk, a flash storage, a hard disk, or a magneto-optical disk or downloaded over a network and stored as a non-transitory data on one of the aforementioned mediums, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the present invention has been particularly shown and described with reference to an exemplary embodiment thereof, it will be understood by those skilled in the art that various changes in form and details may be made therein without departing from the spirit and scope of the invention as defined by the appended claims. For example, while throughout the specification user touch has been disclosed, an artisan appreciates that the claimed invention is applicable with other types of contact, such as via a stylus, or through the use of a pointing device such as a mouse. In addition, while a mobile device is preferred for the explanations provided herein, the claimed invention is applicable to many other types of devices including but in no way limited to personal computers, notebook computers, tablet computers, lap-top computers, Personal Digital Assistants (PDAs).

What is claimed is:

1. An apparatus comprising:
   memory to store a specified application;
   communication circuitry;
   a touchscreen display; and
   a processor adapted to:
   execute the specified application, the executing including displaying, in a user interface corresponding to the specified application and displayed on the touchscreen display, an item including an identification corresponding to a message sent to or received from an external electronic device via the communication circuitry;
   display a first object indicative of a first specified function concurrently with at least one part of the item in the user interface in response to the item being moved in a first direction according to a first input received with respect to the item;
   display a second object different from the first object indicative of a second specified function different from the first specified function, the second object displayed concurrently with at least another part of the item in the user interface in response to the item being moved in a second direction opposite of the first direction, according to a second input received with respect to the item; and
   execute the first specified function or the second specified function based at least in part on a determination that movement of the item in a corresponding direction of the first direction or the second direction meets a specified condition,
   wherein the processor is further adapted to display an animated image disposed between the item that is moved and one of the first object and the second object, and displayed in response to the item being moved in the first direction or the second direction.

2. The apparatus of claim 1, wherein the processor is adapted to:
   execute an email application as at least part of the specified application,
   wherein the first object and the second object are displayed within a vertically scrollable list, and wherein the first input in the first direction and the second input in the second direction opposite the first direction are drag movements that shift the item horizontally.

3. The apparatus of claim 1, wherein the processor is adapted to:
   display the item as at least part of a list that is vertically scrollable and includes a plurality of items sequentially arranged.

4. The apparatus of claim 1, wherein the processor is adapted to:
   display, as at least part of the identification, a name of a sender corresponding to the message.

5. The apparatus of claim 1, wherein the processor is adapted to:
   maintain a location of the first object in the user interface while the item is being moved in the first direction according to the first input.

6. The apparatus of claim 1, wherein the processor is adapted to:

display an icon related to one of the first specified function and the second specified function.

7. The apparatus of claim 1, wherein the processor is adapted to:
perform the displaying of the item such that the at least part of the item is displayed using a first visual effect; and
perform the displaying of the first object such that the at least one part of the item is displayed using a second visual effect different from the first visual effect.

8. The apparatus of claim 7, wherein the processor is adapted to:
remove the second visual effect based at least in part on a third input to scroll vertically.

9. The apparatus of claim 1, wherein the specified condition includes movement of the item reaching either a first critical point or a second critical point located within an initial display region of the item, and wherein the processor is further adapted to:
execute the first specified function based at least in part on a determination that the first input is moved in the first direction as to exceeding the first critical point; or
execute the second specified function that the second input based at least in part on a determination that the second input is moved in the second direction as to exceeding the second critical point.

10. The apparatus of claim 1, wherein the processor is adapted to:
delete the item from the touchscreen display based at least in part on the executing the first specified function.

11. An apparatus comprising:
memory to store a specified application;
communication circuitry; and
a processor adapted to:
execute the specified application, the executing including displaying, in a user interface corresponding to the specified application, an item including an identification corresponding to a message sent to or received from an external electronic device via the communication circuitry;
display a first object indicative of a first specified function concurrently with at least one part of the item in the user interface in response to the item being moved in a first direction according to a first input received with respect to the item; and
display a second object indicative different from the first object of a second specified function different from the first specified function, the second object displayed concurrently with at least another part of the item in the user interface in response to the item being moved in a second direction opposite the first direction, according to a second input received with respect to the item,
wherein the processor is further adapted to display an animated image disposed between the item that is moved and one of the first object and the second object, and displayed in response to the item being moved in the first direction or the second direction.

12. The apparatus of claim 11, wherein the first object or the second object, when displayed, further includes display of an icon and a text related to the first specified function or the second specified function, respectively, and
wherein the processor is adapted to:
wherein the first object and the second object are displayed within a vertically scrollable list, and wherein the first input in the first direction and the second input in the second direction opposite the first direction are drag movements that shift the item horizontally.

13. The apparatus of claim 11, wherein the processor is adapted to:
perform the displaying of the item such that the at least part of the item is displayed using a first visual effect; and
perform the displaying of the first object such that the at least one part of the item is displayed using a second visual effect different from the first visual effect.

14. The apparatus of claim 13, wherein the processor is adapted to:
remove the second visual effect based at least in part on a third input to scroll vertically.

15. A non-transitory machine-readable storage device storing instructions that, when executed by one or more processors, cause the one or more processors to perform operations comprising:
executing, at an electronic device, a specified application, the executing including displaying, in a user interface corresponding to the specified application, an item including an identification corresponding to a message sent to or received from an external electronic device;
displaying a first object indicative of a first specified function concurrently with at least one part of the item in the user interface in response to the item being moved in a first direction according to a first input received with respect to the item; and
displaying a second object different from the first object indicative of a second specified function different from the first specified function, the second object displayed concurrently with at least another part of the item in the user interface in response to the item being moved in a second direction opposite the first direction, according to a second input received with respect to the item,
wherein an animated image is displayed between the item that is moved and one of the first object and the second object, and displayed in response to the item being moved in the first direction or the second direction.

16. The non-transitory machine-readable storage device of claim 15, wherein the displaying of the first object comprises:
performing the displaying of the item such that the at least part of the item is displayed using a first visual effect; and
performing the displaying of the first object such that the at least one part of the item is displayed using a second visual effect different from the first visual effect,
wherein the first object and the second object are displayed within a vertically scrollable list, and wherein the first input in the first direction and the second input in the second direction opposite the first direction are drag movements that shift the item horizontally.

17. The non-transitory machine-readable storage device of claim 16, wherein the displaying of the first object comprises:
removing the second visual effect based at least in part on a third input to scroll the item vertically.

18. The non-transitory machine-readable storage device of claim 16, wherein the displaying of the first object comprises:
changing, as at least part of the second visual effect, a color of a background for the at least one part of the item.

* * * * *